Oct. 22, 1940.   H. V. REED   2,219,114
FRICTION CLUTCH
Filed Aug. 26, 1937   3 Sheets-Sheet 2
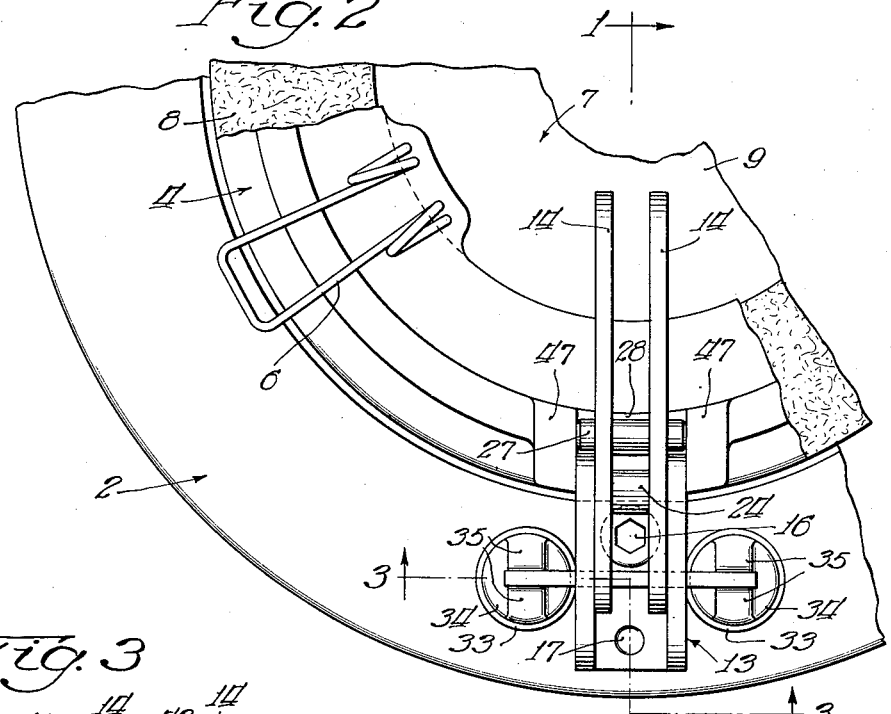
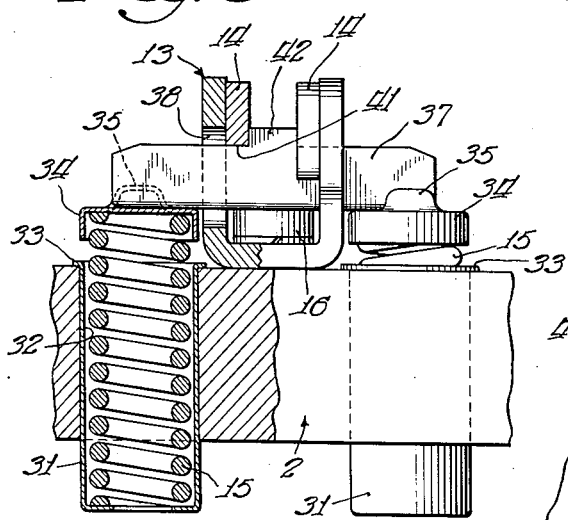
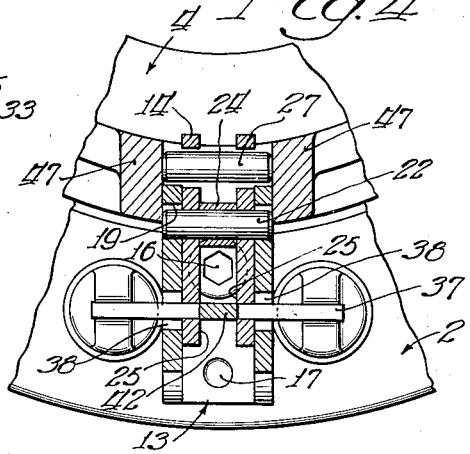
Inventor:
Harold V. Reed
By: Edward C. Gritzbaugh
Atty.

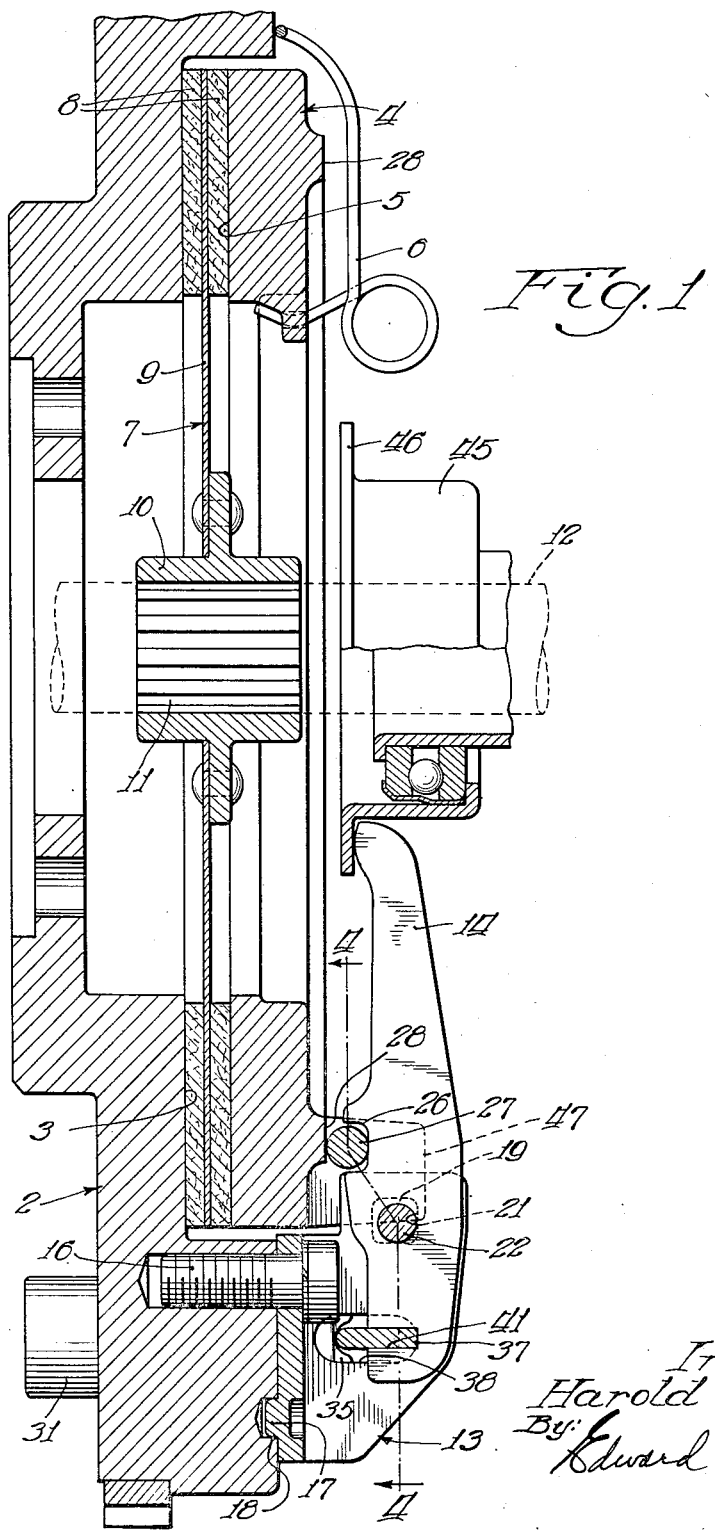

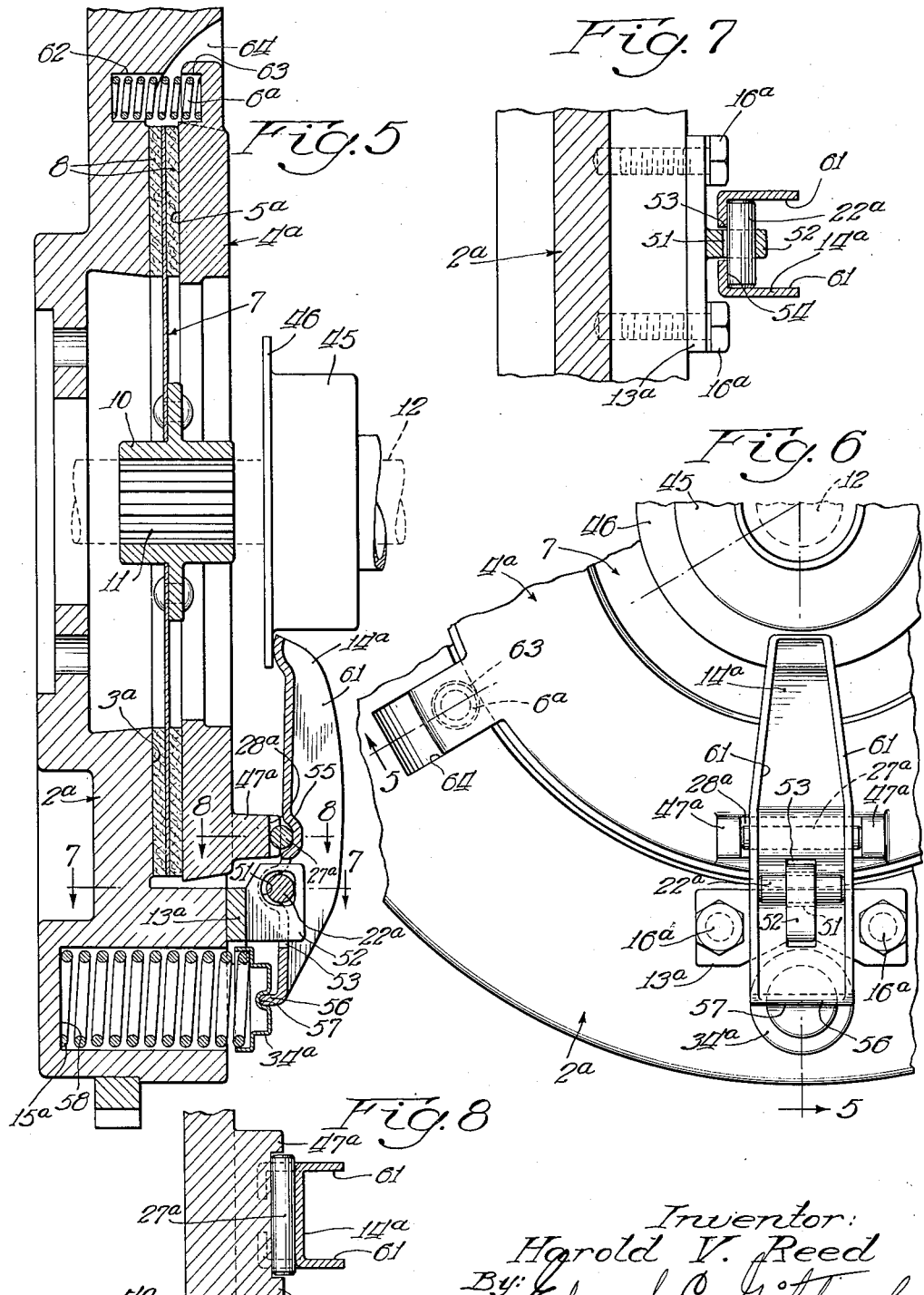

Patented Oct. 22, 1940

2,219,114

UNITED STATES PATENT OFFICE 2,219,114

FRICTION CLUTCH

Harold V. Reed, Chicago, Ill., assignor to Borg-Warner Corporation, Chicago, Ill., a corporation Application August 26, 1937, Serial No. 161,047

19 Claims. (Cl. 192—68)

This invention relates to improvements in friction clutches, and more particularly to friction clutches of the type employed releasably to interconnect the engine and the change-speed transmission of a motor vehicle.

An object of my invention is to provide an improved friction clutch wherein the clutch pressure springs are located in a position remote from the pressure plate so that heat generated during operation of the clutch may not be transferred from the pressure plate to the springs, thus to draw their temper and to impair their operating characteristics.

Another object is to provide an improved friction clutch wherein errors due to deflection of the lever mounting are reduced to a minimum. This advantage is attained by mounting the levers on relatively rigid mounting members secured directly upon the flywheel as distinguished from that type of mounting in which the levers are carried upon mounting means secured to a pressed sheet steel cover carried by the flywheel and enclosing the clutch assembly.

A further object is to provide an improved friction clutch wherein the clutch release levers serve to transmit clutch-engaging forces from the clutch pressure springs to the pressure plate at a force multiplying ratio.

Other objects, the advantages and uses of the invention will become apparent after reading the following specification and claims, and after consideration of the drawings forming a part of the specification, wherein—

Fig. 1 is a vertical sectional view of a motor vehicle clutch constructed in accordance with my invention;

Fig. 2 is a fragmentary rear plan view of the clutch illustrated in Fig. 1;

Fig. 3 is a sectional view along the line 3—3 of Fig. 2;

Fig. 4 is a sectional view along the line 4—4 of Fig. 1;

Fig. 5 is a view similar to Fig. 1 of another embodiment of my invention;

Fig. 6 is a view similar to Fig. 2 of the clutch illustrated in Fig. 5;

Fig. 7 is a sectional view along the line 7—7 of Fig. 5, and

Fig. 8 is a sectional view along the line 8—8 of Fig. 5.

With reference to Figs. 1 to 4, inclusive, I have illustrated at 2 the flywheel of an internal combustion engine upon which my improved clutch is directly mounted, and which presents at 3, one of the friction driving surfaces of the clutch. The surface 3 is preferably located in a recessed central portion of the flywheel 2, and lies in a plane perpendicular to the axis of rotation of the clutch. An annular pressure plate 4 having a friction surface 5 parallel to the surface 3, is located in register with and partially within the recessed portion of the flywheel 2. A plurality of relatively light steel springs 6 are disposed between the pressure plate 4 and the flywheel 2 in the manner shown, and tend yieldingly to urge the pressure plate 4 away from the surface 3 on the flywheel.

The driven element of the clutch may comprise friction clutch plate 7, of the conventional type, having a pair of friction facings 8, one mounted upon each side of a metal disc 9 fixed centrally upon a hub assembly 10. The hub 10 may be internally splined, as indicated at 11, for mounting upon the transmission shaft 12 of the motor vehicle, as indicated in dotted lines.

Means for supplying pressure to the pressure plate 4 in the direction of the flywheel 2, and for relieving such pressure when it is desired to release the clutch, may comprise a plurality of spring means and release levers including a lever mounting member 13, one for each of the pairs of release levers 14, and a plurality of compression springs 15 operatively associated with each pair of the levers 14 operable to apply spring pressure through the levers to the pressure plate. The mounting members 13 may be substantially U-shaped in cross section, as indicated in Fig. 3, and each secured to the rearward face of the flywheel 2 by a bolt 16 passing through the base of the mounting member and threaded into the flywheel. In order that the mounting members 13 may not move about the axis of the bolts 16, projections 17 may be formed on the under surface of the mounting and received in shallow depressions 18 formed in the adjacent face of the flywheel 2.

With reference to Figs 1 and 4, it will be noted that the mounting members 13 are each provided with registering openings 19 through the side portions thereof, each of the openings having a substantially flat wall, as indicated at 21, upon which the opposite end portions of a pivot pin 22 may rest. The pivot pins 22 are carried one by each pair of levers 14, and each pair of levers is disposed between the parallel side portions of the mounting member, as indicated in Figs. 3 and 4. A spacer sleeve 24 may be located about each of the pivot pins 22 between the adjacent side portions 25 of the levers 14.

Each of the levers 14 has formed on its edge adjacent to the pressure plate 4, depressions 26, the inner walls of which provide flat bearing surfaces for thrust rollers 27. The thrust rollers 27 are adapted also to bear a flat surface 28 formed on the rearward face of the pressure plate 4 so that movement of the levers about their pivot pins 22 may permit the thrust rollers 27 to roll upon the surfaces 26 and 28 during lever movement.

The springs 15, two of which may be employed for each lever assembly, are mounted, as indicated in Fig. 3, within metal cups 31 extending through openings 32 through the flywheel 2, each cup having a flange 33 at its outer end to restrain the cups against axial movement under spring compression. The outer end of each of the springs has disposed thereon a cap 34 formed on the top thereof with spaced projections 35 between which may be located one end of a thrust member 37. The thrust members 37 may extend through elongated and registering openings 38 formed in the side portions of the mounting member 13, thus to limit movement of the thrust members 37 under the force of the springs 15 in the direction of the levers 14. The mid-portion of each thrust member is located within a slot 41 formed in each of the levers 14, the levers being separated one from another at points adjacent to the thrust member by an ear 42 formed on the thrust member which extends outwardly between the levers, as shown in Fig. 3.

From the foregoing it will be noted that each level assembly comprises a pair of spaced apart levers 14, both having rolling contact with a thrust roller 27 which in turn is free to roll upon a flat surface 28 formed upon the rearward face of the pressure plate, each lever being pivoted upon a substantially floating pivot pin 22 and a plurality of compression springs for each pair of levers arranged so that spring pressure is transferred from the springs collectively through a thrust member 37 to the ends of the levers.

Such an arrangement as described affords numerous advantages in clutch operation. One such advantage is that relatively deep compression springs 15 may be employed of a total length when compressed greater than the thickness of the flywheel without any increase in the overall depth of the clutch, and in the structure illustrated, the added advantage of actually diminishing the overall axial dimension of the clutch assembly.

Another advantage attributable to my improved clutch construction is that deflection of the operating lever mounting is reduced to a minimum because of the direct mounting of the levers through the mounting brackets 13 upon the rigid flywheel structure, as distinguished from the conventional release lever mounting assembly wherein the levers are pivotally mounted upon supports fixed to a metal cover, which in turn is secured to the flywheel of the engine.

During operation, pressure from the springs 15 is transferred through the thrust members 37 to the adjacent ends of the levers 14, and to the pressure plate 4 through the levers and the thrust rollers 27, the levers being free to turn about their pivot pins 22 in such manner that pivotal movement of the levers results in rolling action of the pivot pins 22 and thrust rollers 27 upon their respective bearing surfaces 21 and 28. The driven plate 7 is thus caused to be compressed between the pressure plate 4 and the surface 3 of the flywheel and to thereby establish frictional driving engagement between the driving and driven elements of the clutch. To release the clutch, a clutch release collar 45 may be drawn to the right along the shaft 12, as viewed in Fig. 1, by any suitable clutch control means, and a flange 46 on the collar engageable with the radially innermost ends of the levers 14, will cause the levers to pivot upon their pivot pins 22 against the force of the springs 15, and to relieve pressure heretofore applied to the pressure plate 4 through the rollers 27. During this procedure, the pressure plate 4 will follow the thrust rollers 27 because of the functioning of the springs 6 which tend always to draw the pressure plate 4 away from the surface 3 of the flywheel 2.

Throughout the entire range of operation of the clutch, all moving parts, including the pivot pins 22, the thrust rollers 27, the thrust members 37, the springs 15 and associated parts, are maintained in operative assembly. The pivot pins 22 and thrust rollers 27 are so maintained because of end engagement with lugs 47 on the pressure plate 4, and the thrust members 37 by virtue of their disposition within the aligned openings 38, which in limiting the movement of the thrust members also acts to maintain the spring assemblies in their proper operative positions. Disassembly of the clutch parts as for repair or replacement, however, necessitates only the removal of the bolts 16, one for each of the lever assemblies, whereupon all moving and operating parts of the clutch may be withdrawn without the removal of other fastening means.

In Figs. 5 to 8, inclusive, I have illustrated another embodiment of my improved clutch, in which principal parts similar in character to parts illustrated in Figs. 1 to 4 inclusive, bear like reference numerals with the suffix letter a.

The structure of Figs. 5 to 8 inclusive, differs from that previously described in that each operating lever assembly comprises a single stamped sheet metal lever 14a and a single spring 15a for each lever. The levers 14a are mounted upon pivot pins 22a which seat in an opening 51 extending through an upstanding lug 52 on the mounting members 13a. The lug 52 is adapted to project through an opening 53 formed in the body of the lever 14a. I prefer to form the opening 51 of a diameter slightly greater than the diameter of the pivot pin 22a, and of such shape, as shown, as to provide a flat bearing surface for the pivot pin. In order that the lever 14a may maintain in place upon the pivot pin 22a, the pin 22a is located in a cylindrical pocket 54 formed in the adjacent and outer wall of the lever 14a. On the opposite side of the lever and at a point radially inwardly of the pocket 54 is a similar pocket 55 having a flat bottom wall upon which the thrust roller 27a bears at one side, and upon the opposite side, upon a flat surface 28a formed on the pressure plate 4a. The radially outward end of the lever has an inturned portion 56 which is received in a groove 57 formed at the top of the cap 34a associated with the compression spring 15a.

I prefer, in this form of the clutch, to place the springs 15a within a cylindrical recess 58 formed in the body of the flywheel 2a. The lever mounting bracket 13a may be fixed to the flywheel by a plurality of bolts 16a, in the present construction, one on each side of the mounting bracket. In order that the thrust rollers 27a may not become displaced, projections 47a may be formed one on each side of the surface 28a on which the rollers ride, thus to restrain the rollers against endwise displacement by engagement with the side 61 of the levers 14a, as best shown in Fig. 7.

The springs employed to urge the pressure plates 4a away from the surface 3a of the flywheel, may be compression springs 6a, located in pockets 62 and 63 in the flywheel and pressure plate respectively. That portion of the pressure plate 4a in which the pockets 63 are disposed may take the form of a radially projecting portion of the pressure plate 4a receivable in a radially grooved portion 64 of the flywheel, thus to provide a driving connection between the pressure plate 4a and the flywheel, yet to permit axial movement of the pressure plate as required during engagement and disengagement of the clutch (see Figs. 5 and 6).

The operation of the clutch described in Figs. 5 to 8 inclusive, is substantially the same as that of the clutch illustrated in Figs. 1 to 4 inclusive.

I claim:

1. In a friction clutch, a rigid driving member, a pressure plate movable axially relative to said member and cooperating therewith to provide parallel and opposed flat surfaces, a plurality of compression springs disposed partially within the body of said driving member with their axes intercepting the plane of said pressure plate and reacting against said driving member, a plurality of levers mounted for pivotal movement relative to said driving member and each having applied thereto at one side of their pivotal mounting the force of compression of at least one of said compression springs, thrust members interposed between said pressure plate and said levers on the other side of the pivotal mounting of the levers and having rolling contact with the pressure plate and levers respectively, and means for moving said levers against the action of said compression springs at will.

2. In the combination, defined in claim 1, a plurality of spring members tending always to move said pressure plate axially away from said driving member against the superior forces of said compression springs.

3. The combination, as defined in claim 1, wherein the pivotal mounting for said levers relative to said driving member comprises pivot pins fixed against lateral movement relative to said levers but free to roll on substantially flat surfaces fixed relative to said driving member.

4. A friction clutch comprising, a rigid driving member mounted for rotation about a fixed axis, a pressure plate mounted for axial movement relative to said driving member, a driven plate interposed between said driving member and said pressure plate and adapted for frictional driving engagement therewith when compressed therebetween, a plurality of clutch operating levers, means mounting said levers for pivotal movement relative to said driving member, thrust means between said levers, at one side of their pivot points, and said pressure plate, and spring means carried by said driving member and under compression between said driving member and said levers on the other side of their pivot points, said spring means comprising a plurality of groups of compression springs, a group for each lever, and a member associated one with each group of springs and bearing directly upon said lever, said last named member being engageable with a portion of said lever mounting means to limit the extension of said springs in the direction of said lever.

5. In a friction clutch, a rigid driving member, a pressure plate movable axially relative to said member and cooperating therewith to provide parallel and opposed flat surfaces, a plurality of compression springs disposed partially within the body of said driving member, a plurality of levers mounted for pivotal movement relative to said driving member and each having applied thereto at one side of their pivotal mounting the force of compression of at least one of said compression springs, thrust members interposed between said pressure plate and said levers on the other side of the pivotal mounting of the levers and having rolling contact with the pressure plate and levers respectively, and means for moving said levers against the action of said compression springs at will, said levers being arranged in groups about the circumferential portion of said driving member and the forces of compression of at least two of said compression springs being applied to each of the levers of said group through the medium of thrust means common to all of the levers of each group.

6. A friction clutch comprising, a rigid driving member, a pressure plate mounted for movement along the axis of said driving member, a driven element interposed between said driving member and said pressure plate, a mounting member fixed to said driving member radially outwardly of the periphery of said pressure plate, a clutch operating lever having an opening therethrough intermediate its length, said mounting member having a projection extending through said opening, a pivot pin carried by said lever and having bearing engagement with said projection, a compression spring between said driving member and the adjacent end of said lever, and a thrust member located between said pressure plate and the opposite end portion of said lever.

7. A friction clutch plate, as defined in claim 6, wherein said thrust member comprises a thrust roller interposed between the lever and the pressure plate and having rolling engagement with the pressure plate.

8. In a friction clutch, a driving member, a driven element, a pressure plate axially movable for engaging said driven element between itself and the driving member, a plurality of pairs of springs carried by the driving member, for imposing pressure on said pressure plate, a radially extending lever associated with each pair of springs, pivoted with respect to the driving member and in thrust-transmitting association with said pressure plate at a point located on the other side of its pivot from said springs, and an equalizing yoke engaged against said pair of springs at its ends and engaging the lever intermediate its ends, for transmitting thrust from said springs to said lever.

9. In a friction clutch, a driving member, a driven element, and a pressure plate axially movable for engaging said driven element between itself and the driving member, an operating lever, mounting means projecting from the driving member, comprising a pair of spaced wings between which said lever is received, a fulcrum pin extending through said lever and through said wings, for fulcruming the lever in said wings, and a pair of spaced lugs projecting from said pressure plate, embracing portions of said wings, and confining the ends of said fulcrum pin against circumferential displacement.

10. A friction clutch as defined in claim 9, including a thrust element interposed between the pressure plate and said lever, and also confined between said spaced lugs.

11. In a friction clutch, a driving member, a driven element, a pressure plate axially movable for engaging said driven element between itself and the driving member, an operating lever, a pair of spaced wings projecting from the driving member and embracing said lever, axially elongated openings in said wings, a pair of compression springs disposed on either side of said pair of wings, an equalizing yoke engaged against said springs at its ends and against said lever intermediate its ends for transferring thrust from said springs to said lever, said yoke being engageable with extremities of said openings for limiting the movements of said lever under said spring pressure.

12. In a friction clutch, a driving member, a driven element, a pressure plate axially movable for engaging said driven element between itself and the driving member, axially extending spring pockets formed in the driving member radially beyond the periphery of and intersecting the plane of the driven element, compression springs in said pockets, and operating levers fulcrumed with respect to said driving member radially inwardly of said pockets, having their outer ends arranged to receive thrust from said compression springs, and in thrust-transmitting association with said pressure plate inwardly of their fulcrums.

13. In a friction clutch, a driving member, a driven element, and a pressure plate axially movable for engaging said driven element between itself and the driving member, a plurality of operating levers each fulcrumed with respect to the driving member, spring means acting against said levers, and thrust rollers interposed between said levers and the pressure plate and adapted to transmit to the pressure plate the forces received from said spring means, said rollers having rolling engagement with flat surfaces on the pressure plate and each lever being formed with a notch receiving its respective roller, said notch having a centrally flat bottom and having end extremities spaced from the opposite side regions of the roller so as to allow restricted rolling movement of the roller in said notch.

14. In a friction clutch, a driving member, a driven element, and a pressure plate axially movable for engaging said driven element between itself and the driving member, a plurality of operating levers each fulcrumed with respect to the driving member, spring means acting against said levers, and thrust rollers interposed between said levers and the pressure plate and adapted to transmit to the pressure plate the forces received from said spring means, the regions of said pressure plate and levers engaged by said rollers being formed so as to allow said rollers to roll with respect to both said pressure plate and said levers, said pressure plate including pairs of spaced axially projecting lugs between which the levers and the thrust rollers are confined against circumferential movement.

15. In a friction clutch, a driving element, a driven element, a pressure member axially movable for engaging said driven element between itself and the driving element, an operating lever member fulcrumed with respect to the driving element, spring means arranged to deliver clutch packing pressure to said lever member, and a thrust roller interposed between said lever member and the pressure member in a position to transmit to the pressure member the forces received from said spring means, one of said members having a flat surface against which said roller has rolling engagement, and the other of said members being formed with a notch receiving said roller, said notch having a centrally flat bottom and having at opposite extremities a pair of abutment surfaces confining said roller for restricted rolling movements in said notch.

16. A friction clutch as defined in claim 15, wherein said member with the flat surface is formed, on either side of said surface, with integral axially projecting abutment members confining said roller against endwise movement.

17. In a friction clutch, a driving member, a driven element, and a pressure plate axially movable for engaging said driven element between itself and the driving member, a plurality of operating levers each fulcrumed with respect to the driving member, spring means acting against said levers, and thrust rollers interposed between said levers and the pressure plate and adapted to transmit to the pressure plate the forces received from said spring means, each of said members having a flat surface against which said roller may roll, one of said members having on either side of its said flat surface a pair of integral abutment members confining said roller for limited rolling movement and the other of said members having on either side of its said flat surface a pair of abutment members confining said roller against endwise movement.

18. In a friction clutch, a driving member, a driven element, and a pressure plate axially movable for engaging said driven element between itself and the driving member, a plurality of operating levers each fulcrumed with respect to the driving member, spring means acting against said levers, and thrust rollers interposed between said levers and the pressure plate and adapted to transmit to the pressure plate the forces received from said spring means, each lever having a flat surface against which its roller may roll, and having on either side of said flat surface a pair of opposed integral abutment members confining said roller for limited rolling movement, said pressure plate having a flat surface against which said roller may roll.

19. A friction clutch as defined in claim 18, wherein said pressure plate has on either side of its said flat surface an integral abutment member confining said roller against endwise movement.

HAROLD V. REED.